Aug. 1, 1939.　　　　J. F. ANDERSON　　　　2,167,737
CAN AND METHOD OF MAKING SAME
Filed Feb. 18, 1937
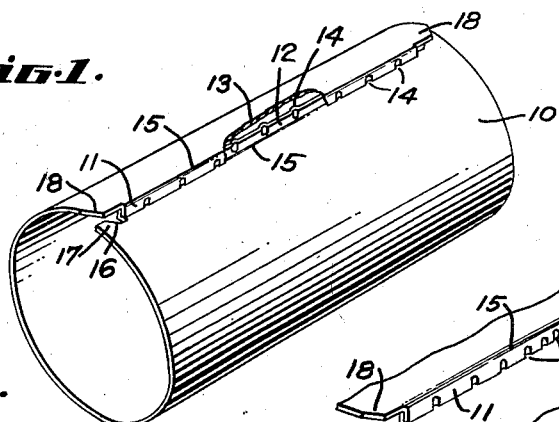
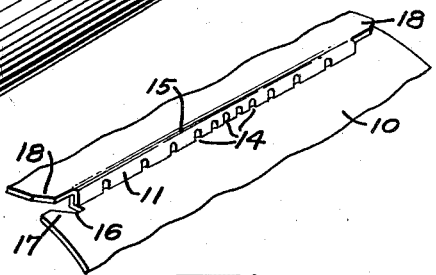
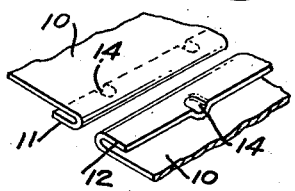
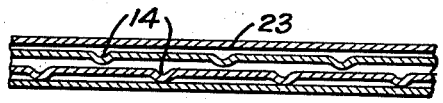
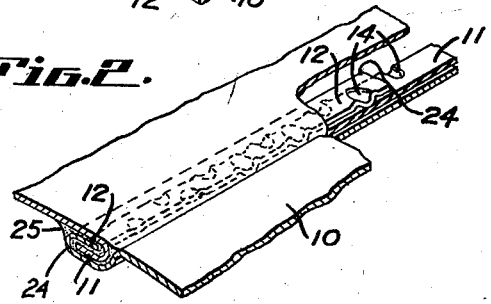
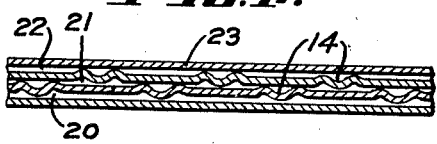
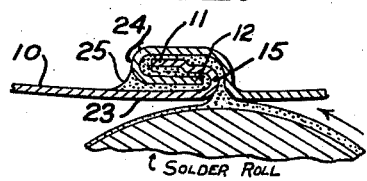
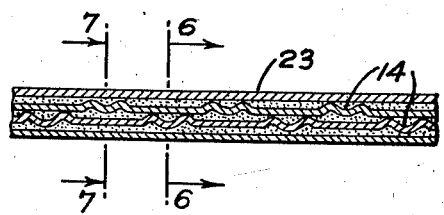
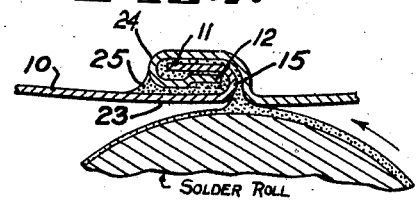
INVENTOR.
JOHN F. ANDERSON
BY A. Dunham Owen
ATTORNEY.

Patented Aug. 1, 1939

2,167,737

UNITED STATES PATENT OFFICE 2,167,737

CAN AND METHOD OF MAKING SAME

John F. Anderson, Piedmont, Calif., assignor to Pacific Can Company, a corporation of Nevada Application February 18, 1937, Serial No. 126,330

3 Claims. (Cl. 113—120)

My invention relates to the formation of a can body, and particularly to the side seam and a method of forming it.

The broad object of my invention is to provide a can body in which the solder in the seam is distributed throughout the several layers between the four thicknesses of tin, and yet have the seam of a form which does not show any cuts, protrusions, indentations, etc., either on its inside or on its outside.

Another broad object of my invention is to provide a side seam with a somewhat loose interlock; that is, one having a series of solder conduits therethrough to carry solder completely in between the several layers of the seam, the looseness of which avoids any obstruction to form air pockets which might require venting.

Another object of my invention is to provide a can body blank made with the minimum amount of cutting or notching, and in which the edges of the hooks for the seam are indented but not cut through.

Another object of my invention is to provide a side seam for can bodies constructed so that a fillet of solder will form on the inside of the can and bridge the gap at the seam, thereby providing a surface more easily covered by lacquer or other lining which may subsequently be applied to the can body.

Another object of my invention is to provide a novel form of can body seam construction in which conduits are provided through the several seam layers to promote the flow of solder.

Another object of my invention is to provide a can body seam of the last-described type in which there are more conduits near the center than at the ends for the purpose of facilitating the solder flow in the middle portion of the seam when it is over the solder roll.

Other objects and advantages of my invention will appear from the following description and the drawing, in which:

Fig. 1 is a perspective view of a tubular can body formed with my improved side seam, showing the hooks engaged but prior to bumping, and with a portion of the outer hook broken away to disclose the construction;

Fig. 2 is a perspective view of a portion of the seam with various parts cut away;

Fig. 3 is a sectional view taken down the center of the seam, and illustrates the seam after hooking but before bumping;

Fig. 4 is like Fig. 3 except that the seam has been bumped;

Fig 5 is like the preceding two figures, and shows the seam after application of the solder;

Fig. 6 is a section taken through the seam on line 6—6 of Fig. 5;

Fig. 7 is a sectional view taken through the seam on line 7—7 of Fig. 5;

Fig. 8 is an enlarged perspective view of a portion of the hooks before interengagement; and Fig. 9 shows a modified form of my device.

It is to be understood that for purposes of illustration certain dimensions have been exaggerated and parts shown thicker than if drawn to scale.

In the drawing I have shown one form of my invention, the main purpose of which is to provide conduits or channels in the hooked portions of the seam into and through which the solder may flow from the outside of the can where it is applied in fluid condition by the solder roll, the solder flowing on through to the inside of the can, there to form a fillet and bridge the seam joint as well as to fill the spaces between the seam hooks.

In the drawing, the can body 10 is formed with oppositely pointing hooks 11 and 12 adapted to be interengaged as shown in Fig. 1.

Fig. 1 illustrates the can body before it is completed, and with the hooks 10 and 11 interengaged, but before flattening or bumping. Outer hook 11 is cut away at 13 to expose a portion of inner hook 12.

In the preferred form of my invention I accomplish the thorough distribution of the solder between the four layers of the lock seam by providing a plurality of indentations or grooves 14 in the hooks 11 and 12.

The grooves or indentations 14 give a wavy appearance to the edge of the hooks, are formed near the edge of hooks 11 and 12, and preferably do not extend in from the edge as far as the bend 15. I prefer that they should be relatively shallow and extend back from the edge only a short distance in order that the completed seam will appear smooth and regular both on the inside and outside. (See lower end of Fig. 2.) For a beer can seam I have found satisfactory a depression which extends back on the hooks about 5/64" to 3/32" where the hook is 1/8" long.

The depressions or grooves 14 may be formed in the flat can blank at the same time the notches 16 are cut to form the lap portions 17 and 18 on the ends of the can body, or they may be formed after the hooks 11 and 12 have been formed. I have found that no matter how shallow these depressions or wrinkles in the hook are formed, the bumping operation will not remove them entirely, therefore, a series of shallow inter-layer conduits will be present on the inside of the seam when the can blank has been bumped and is ready for the soldering operation.

Preferably the grooves 14 in hooks 11 and 12 are staggered or out of phase so as to tend to make the solder take a criss-cross path as it flows through the conduits and fills the interstices 20, 21 and 22 between the four layers of tin forming the seam.

As will be apparent (see Figs. 3 to 7) I prefer not to close the hooks together so tightly that the hook 12 is nested between outer wall portion 23 and hook 11, in what would amount practically to an air-tight joint, as this practice would interfere with the free flow of air and solder through the seam layers to the inside of the can body. My construction, I find, avoids the presence of "islands" in the soldered seam, which in this art means unsoldered zones between adjacent seam surfaces and are currently believed to be caused by the expansion of entrapped air. The conduits allow a free flow of air through the seam and require no special notching, perforations, or venting of the seam as is the case in the partially sealed type of seam referred to.

In my invention, therefore, instead of confining the solder principally to the outer lap of the four thickness joint, I provide these conduits to lead the solder in an S shaped course until it has filled the three laps at the joint, and, as well, has filled in or bridged the seam fold gap in the inside of the can at 25.

While the general behavior of fluid solder is such as not to unite two adjacent surfaces unless they are closely spaced, I account for the solder filling the somewhat wider spacing in the lapped wrinkled faces of the seam mainly by the careful application of the flux and possibly also by the fact that the S shaped route it must travel, plus the staggered location of the conduits, builds up a resistance to the flow of the solder as it leaves the solder roll. That is, the resistance acts as a sort of dam and allows more solder to be forced into and retained by the seam joints.

By means of my invention I thus avoid having to perforate or cut out portions of the hooks forming the lock seam, both of which require specially adapted machinery and give added expense in tool maintenance. I find, further, that the sidewise venting for which these perforations or cut-outs are usually provided is not necessary because in my invention I am not trying to confine the solder substantially to the outside lap of the interengaged hooks. It is important to note that the interengaged hooks of the seam of a can made according to my invention are not "bumped" together so tightly as to form air-tight pockets which require venting,—the conduits provide a substantially free, clear-through S passage for the solder so that it does not have an opportunity to run into confined air pockets.

While I have shown the indentations 14 in both hooks, a satisfactory result is obtainable when only one hook is so indented, particularly when the hook 12 is the one indented.

In Fig. 9 I show a modification, in which the spacing of the indentations 14 is the only change over the can body so far described. Here the indentations in a zone midway between the ends are spaced more closely than they are spaced near the ends. The reason for providing more solder conduits in the center zone is to encourage the flow of solder at that place. Due possibly to the inward bowing of the can body near the center, which lifts this part of the seam slightly off the solder roll, or due to the easier flow of solder into the lapped end joints 17 and 18, and adjacent seam, there is usually less solder gets into the zone of the seam midway between the ends. My invention cures this difficulty and allows the entry of sufficient solder to form a satisfactory continuous fillet 25 to bridge the joint at 24.

My use of the word "conduit" herein is not intended to be limited to include only the spaces formed by the depression at the indentations, but also to include the separation of the several seam layers caused by the indentations, and adjacent thereto.

While the can body illustrated has only the two lapped portions 17 and 18, it is obvious that my invention is applicable to any form of hooked side seam, regardless of the number of lapped portions. It is also contemplated that other variations in detail of construction may be made and still have a device which comes within the teaching of my invention and the terms of the following claims.

I claim:

1. In a can body, having a side seam, the major portion of which is formed by interengaged hooks, both of said hooks having a plurality of spaced indentations formed therein before interengagement of said hooks, said seam having inter-layer conduits formed by said indentations remaining after the seam is bumped, the indentations in one hook being in staggered relation to those in the other hook whereby the solder flowing through the seam tends to travel a criss-cross path.

2. In a combination lock and lap seam can body, the hooks forming the lock portion thereof having a pronounced wave formed therein before being interengaged, the wave in each hook being out of phase with that in the other, and having a semblance of said waves remaining after the seam is bumped, whereby solder flow conduits are provided through the locked seam.

3. The method of forming side seams in can bodies which consists in indenting the hook portions of the can blank, the indentations on opposite hooks being staggered in relation to each other, interengaging said hook portions, bumping said hook portions to form a plurality of shallow staggered solder conducting conduits on the inside of said seam, and flowing solder into said seam, the staggered relation of said conduits causing the solder to distribute itself throughout the several seam layers.

JOHN F. ANDERSON.